(12) United States Patent
Huang

(10) Patent No.: US 6,778,411 B2
(45) Date of Patent: Aug. 17, 2004

(54) START-UP CIRCUIT FOR POWER CONVERTERS WITH CONTROLLER POWER SUPPLY CONNECTED AT OUTPUT SIDE

(75) Inventor: Fengtai Huang, Windsor (CA)

(73) Assignee: Ballard Power Systems Corporation, Dearborn, MI (US)

( * ) Notice: Subject to any disclaimer, the term of this patent is extended or adjusted under 35 U.S.C. 154(b) by 0 days.

(21) Appl. No.: 10/298,473

(22) Filed: Nov. 18, 2002

(65) Prior Publication Data

US 2004/0095786 A1 May 20, 2004

(51) Int. Cl.[7] .............................................. H02M 3/335
(52) U.S. Cl. ..................................... 363/49; 363/21.08
(58) Field of Search ............................... 363/49, 21.08, 363/16, 21.04, 21.09, 21.16

(56) References Cited

U.S. PATENT DOCUMENTS

| | | | |
|---|---|---|---|
| 4,375,077 A | 2/1983 | Williams | 363/91 |
| 4,497,017 A | 1/1985 | Davis | 363/49 |
| 4,559,590 A | 12/1985 | Davidson | 363/21 |
| 4,695,936 A | * 9/1987 | Whittle | 363/21.1 |
| 4,787,020 A | 11/1988 | Hiramatsu et al. | 363/20 |
| 4,841,425 A | 6/1989 | Maeba et al. | 363/21 |
| 4,941,076 A | 7/1990 | Diaz | 363/49 |
| 5,091,837 A | 2/1992 | Duspiva et al. | 363/15 |
| 5,285,369 A | * 2/1994 | Balakrishnan | 363/49 |
| 5,402,060 A | 3/1995 | Erisman | 323/268 |
| 5,436,820 A | * 7/1995 | Furmanczyk | 363/49 |
| 5,581,453 A | * 12/1996 | Ueta et al. | 363/49 |
| 5,661,642 A | * 8/1997 | Shimashita | 363/21.15 |
| 5,715,155 A | 2/1998 | Shahani et al. | 363/132 |
| 5,883,793 A | 3/1999 | Farrington | 363/16 |
| 5,982,639 A | 11/1999 | Balakirshnan | 363/21 |
| 6,005,781 A | 12/1999 | Balakirshnan | 363/21 |
| 6,233,165 B1 | 5/2001 | Irissou et al. | 363/97 |
| 6,259,618 B1 | * 7/2001 | Liaw et al. | 363/147 |
| 6,314,003 B2 | 11/2001 | Preller | 363/21.04 |
| 6,385,059 B1 | 5/2002 | Telefus et al. | 363/21.15 |
| 6,456,511 B1 | * 9/2002 | Wong | 363/21.13 |
| 6,625,044 B2 | * 9/2003 | Lin | 363/49 |

FOREIGN PATENT DOCUMENTS

WO    WO 98/49766    11/1998

* cited by examiner

*Primary Examiner*—Shawn Riley
(74) *Attorney, Agent, or Firm*—Seed IP Law Group PLLC

(57) ABSTRACT

A start-up circuit for converters with controller power supply connected at output side. With this start-up circuit, all the control and supporting circuitries are connected at the converter output low voltage side and protected from high input DC voltage. After the converter is started and the controller starts generating normal switching pulses, the start-up circuit may be disabled.

23 Claims, 6 Drawing Sheets

START-UP CIRCUIT FOR POWER CONVERTERS WITH CONTROLLER POWER SUPPLY CONNECTED AT OUTPUT SIDE

BACKGROUND OF THE INVENTION

1. Field of the Invention

The present description generally relates to power conversion.

2. Description of the Related Art

Distributed power systems ("DPS") are employed in a large number of power generation applications. In particular, the use of small to medium size DPS in a variety of applications has risen in recent years. A DPS requires a low-voltage power supply ("LVPS"), typically In the range of 12 VDC to 24 VDC, for supplying power to a controller, gate drive, display control unit, customer interface unit, and other supporting units. The power rating of an LVPS typically ranges from a few hundred wafts to one kilowatt. The input of the LVPS is usually from the output of a DPS, which is typically in the range from 400–600 VRMS line-to-line.

The input voltage range of commercially available AC/DC converters is from 85 VRMS to 265 VRMS. Converters with input voltage range beyond 85–265 volts RMS, if even available, are very costly. An AC/DC converter of a few hundred watts having a 480 VRMS input costs between approximately $500 to $800. To make use of commercially available AC/DC converters with input voltage range of 85–265 VRMS, a step-down power transformer is required. The introduction of additional transformer adds extra costs, weight, size and many other negative factors to a DPS. Therefore, there is a need to design an AC/DC converter with wide input voltage range to cover all possible output voltages of a DPS.

The main concern in designing such an AC/DC converter is the high input DC voltage of the LVPS. For example, when the nominal output voltage of a DPS is 600 VRMS line-to-line, the line-to-neutral voltage is 347 VRMS. Considering that the output voltage of a DPS has a tolerance of −12% to +6%, the maximum line-to-neutral voltage will be 367 VRMS. After the input rectifier, the input DC voltage will be 519 VDC. The maximum voltage that the switching device in an AC/DC converter, such as a one switch flyback or forward converter, may be subjected to is up to 2.5 times the DC input voltage, i.e., the required voltage rating of a switching device may be as high as 1300 VDC. Most power MOSFETs that are commercially available are rated at 1200 VDC. With the consideration of the power rating and the input DC voltage of an LVPS, a two switch forward converter is desirable for this application. The maximum voltage that the switching device in a two switch forward converter may be subjected to is the same as the maximum input DC voltage. Thus, for example, the converter may employ 600 V power MOSFETS.

BRIEF SUMMARY OF THE INVENTION

In one aspect, an electrical power converter includes a high voltage node, a low voltage node, a high frequency power transformer having a high voltage side and a low voltage side, the high frequency power transformer coupled between the high voltage node and the low voltage node, a controller operatively coupled to provide control signals to the high frequency power transformer, a controller power supply electrically coupled between the controller and the low voltage side of the high frequency power transformer to provide power to the controller from the low voltage side of the high frequency power transformer, and a startup circuit electrically coupled between the high voltage node and the high voltage side of the high frequency power transformer to provide control signals to the high frequency power transformer in response to power being applied to the high voltage node.

In another aspect, a circuit for an electrical power converter having a high voltage input and a low voltage output includes a high voltage bus having at least a first and a second high voltage rail, a low voltage bus having at least a first and a second low voltage rail, a transformer having a primary side and a secondary side, the primary side electrically coupled to respective ones of the first and second high voltage rails of the high voltage bus, the secondary side of the transformer electrically coupled to respective ones of the low voltage rails of the low voltage bus, the primary side having a number of power transistors, a startup circuit coupled to provide control signals in a first frequency range to the power transistors of the transformer in response to a voltage across the high voltage rails of the high voltage bus, a controller coupled to provide control signals in a second frequency range to the power transistors of the transformer, a controller power supply electrically coupled between the controller and the low voltage bus to provide a low voltage power to the controller during operation of the transformer, and a disable circuit electrically coupled to disable the control signals at the first frequency range while allowing the control signals at the second frequency range.

In another aspect, a converter having a high voltage node and a low voltage node includes transformer means for transforming a high voltage to a low voltage, startup circuit means for providing a first set of control signals at a first frequency to the transformer means in response to a high voltage at a high voltage node, and control means electrically coupled to a low voltage side of the transformer means for providing a second set of control signals at a second frequency, different from the first frequency, to the transformer means in response to a low voltage produced by the transformer means.

In a further aspect, a method of operating a converter having a startup circuit, a controller, and a high frequency power transformer having a high voltage side and a low voltage side includes providing a first set of control signals at a first frequency from the start up circuit to the high frequency power transformer in response to a high voltage supplied to the start up circuit, and providing a second set of control signals at a second frequency, different from the first frequency, from the control circuit to the high frequency power transformer in response to a low voltage supplied to the control circuit from the low voltage side of a high frequency power transformer.

BRIEF DESCRIPTION OF THE SEVERAL VIEWS OF THE DRAWING(S)

In the drawings, identical reference numbers identify similar elements or acts. The sizes and relative position of elements in the drawings are not necessarily drawn to scale. For example, the shapes of various elements and angles are not drawn to scale, and some of these elements are arbitrarily enlarged and/or positioned to improve drawing legibility. Further, the particular shapes of the elements as drawn, are not intended to convey any information regarding the actual shape of the particular elements, and have solely been selected for ease of recognition in the drawings.

DETAILED DESCRIPTION OF THE INVENTION

In the following description, certain specific details are set forth in order to provide a thorough understanding of various embodiments of the invention. However, one skilled in the art will understand that the invention may be practiced without these details. In other instances, well-known structures associated with power converters and electrifiers have not been shown or described in detail to avoid unnecessarily obscuring descriptions of the embodiments of the invention.

Unless the context requires otherwise, throughout the specification and claims which follow, the word "comprise" and variations thereof, such as "comprises" and "comprising" are to be construed in an open, inclusive sense, that is as "including, but not limited to."

The headings provided herein are for convenience only and do not interpret the scope or meaning of the claimed invention.

In typical power converters, a controller power supply, a controller, and many other supporting circuitries are powered from the high voltage input side of the converter. Since the input DC voltage can be as high as 500 VDC, It is more desirable to connect the controller power supply and other supporting circuitries to the low voltage output side of the converter.

While connecting the controller power supply to the low voltage output side avoids operating the control circuitries at high voltage, such a design introduces a starting problem. Normally, where the controller power supply is connected at the high voltage input side of the converter, the converter starts converting power immediately after the application of input power. If however, the controller power supply is connected the low voltage output side, the converter is unable to start itself upon the application of power at the input. This description describes a self startup circuit for a converter, such as a two switch forward converter, having a controller power supply connected at the low voltage output side of the converter.

Converter

Figure 1:
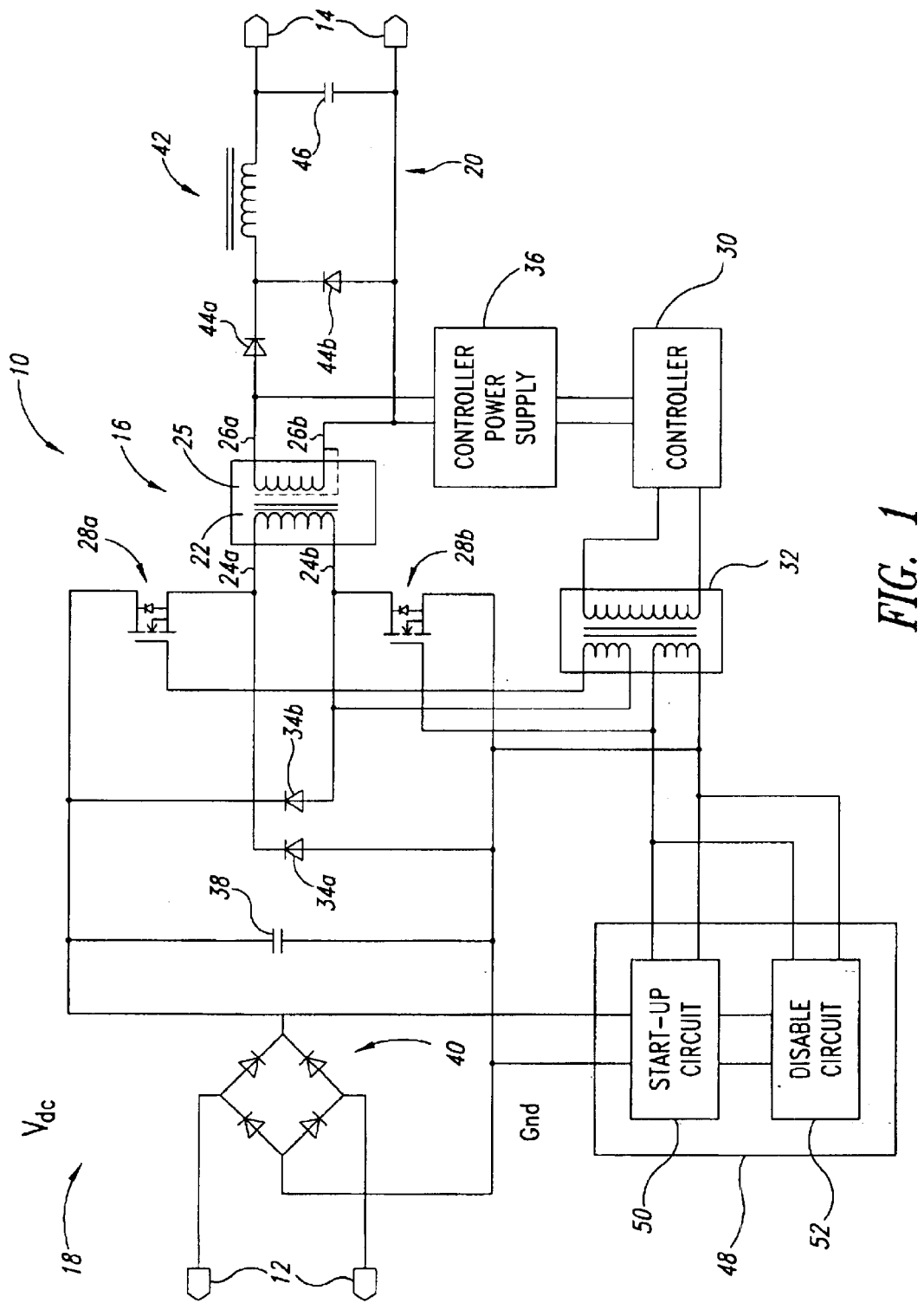
FIG. 1 is an electrical schematic diagram of one illustrated embodiment of a converter having a transformer, a controller electrically powered from a low voltage side of the transformer, and a starting circuit.

FIG. 1 shows an exemplary power converter in the form of a two switch forward converter 10. The converter 10 includes a high voltage node or input 12 couplable to a high voltage power source (not shown), and a low voltage node or output 14 couplable to a low voltage load (not shown). As used herein and in the claims, the terms high voltage and low voltage are used in a relative sense, and are not intended to be associated with any absolute voltage values. Also as used herein and in the claims, the term couplable means selectively coupled or permanently coupled. The high voltage power source can take any of a variety of forms, for example but not limited to, AC power sources such as a generator or turbine, or DC power sources such as a fuel cell stack, battery or ultra-capacitor. The load can also take a variety of forms, for example but not limited to, an electrical motor.

The converter 10 includes a high frequency power transformer 16 coupled between the high voltage input 12 and the low voltage output 14, via a high voltage bus 18 and a low voltage bus 20 respectively. The high frequency power transformer 16 has a high voltage or primary side 22 including first and second poles 24a, 24b electrically coupled to the high voltage input 12, and a low voltage or secondary side 25 including first and second poles 26a, 26b electrically coupled to the low voltage output 14. The high frequency power transformer 16 includes a pair of selectively controllable switches 28a, 28b, for example, MOSFET or IGBT transistors.

The converter 10 also includes a controller 30 for supplying control signals to the gates of the switches 28a, 28b of the high frequency power transformer 16. The controller 30 supplies control signals to the switches 28a, 28b via a gate drive pulse transformer 32. A pair of input diodes 34a, 34b are electrically coupled in series on respective ones of the rails of the high voltage bus 18 between the high voltage input 12 and the high voltage side 22 of the high frequency power transformer 16.

The converter 10 includes a controller power supply 36 for supplying low voltage power to the controller 30. The controller power supply 36 is electrically coupled to receive power via the low voltage bus 20 from the low voltage side 25 of the high frequency power transformer 16.

The converter 10 may also include an input capacitor 38 electrically coupled across the high voltage rails of the high voltage bus 18 and the high voltage side 22 of the high frequency power transformer 16.

In the illustrated embodiment, the converter 10 includes a rectifier 40 for rectifying an AC current received at the high voltage input 12 from the power source. The rectifier 40 may be omitted where the converter 10 takes the form of a DC/DC converter and the input 12 to the converter 10 is a DC supply.

The converter 10 may also include a coil or choke 42 in the low voltage bus 20, between the low voltage output 14 and the low voltage side 25 of the high frequency power transformer 16. The converter 10 may further include a first output diode 44a electrically coupled in series between the choke 42 and one of the poles 26a of the low voltage side 25 of the high frequency power transformer 16. The converter 10 may also further include a second output diode 44b electrically coupled across the low voltage bus 20 between the choke 42 and the low voltage side 25 of the high frequency power transformer 16. The converter 10 may even further include an output capacitor 46 electrically coupled across the low voltage bus 20 between the choke 42 and the low voltage output 14.

Starting Circuit

The converter 10 includes a starting circuit 48 to start operation of the high frequency power transformer 16 When power is applied. Ideally, the starting circuit 48 generates gate drive pulses immediately after the application of power to the high voltage input 12. The startup switching pulses are supplied to the switches 28a, 28b to cause the converter 10 to begin converting power from the high voltage input 12 to the low voltage output 14. The length and time during which the pulses are generated should be such that the voltage level of the controller power supply 36 is sufficiently high to activate the controller 30. Once active, the controller 30 generates normal switching pulses, and the starting circuit 48 should be disabled or the starting pulses suppressed.

To implement the self starting functionality, the starting circuit 48 includes a startup circuit 50 and a disable circuit 52. The startup circuit 50 senses the input DC voltage and generates startup switching pulses (i.e., gate drive pulses at a low frequency, e.g., 1 kHz). The startup switching pulses operate the switches 28a, 28b of the high frequency power transformer 16 to convert power from high voltage input 12 to the low voltage output 14. Once the voltage of the controller power supply 36 reaches the desired operating level, the controller 30 generates normal switching pulses (i.e., gate drive pulses at a high frequency, e.g., 100 kHz). As used herein and in the claims, high and low frequency are used in a relative sense and are not intended to be associated with any absolute frequency values.

The disable circuit 52 may incorporate a high pass filter at its front end. The high pass filter monitors the gate drive pulses, ignoring the low frequency startup switching pulses, and generating a trigger signal to disable the startup circuit 50 when the disable circuit senses the high frequency normal switching pulses. A detailed description of the startup circuit 50 and disable circuit 52 follows.

Figure 2:
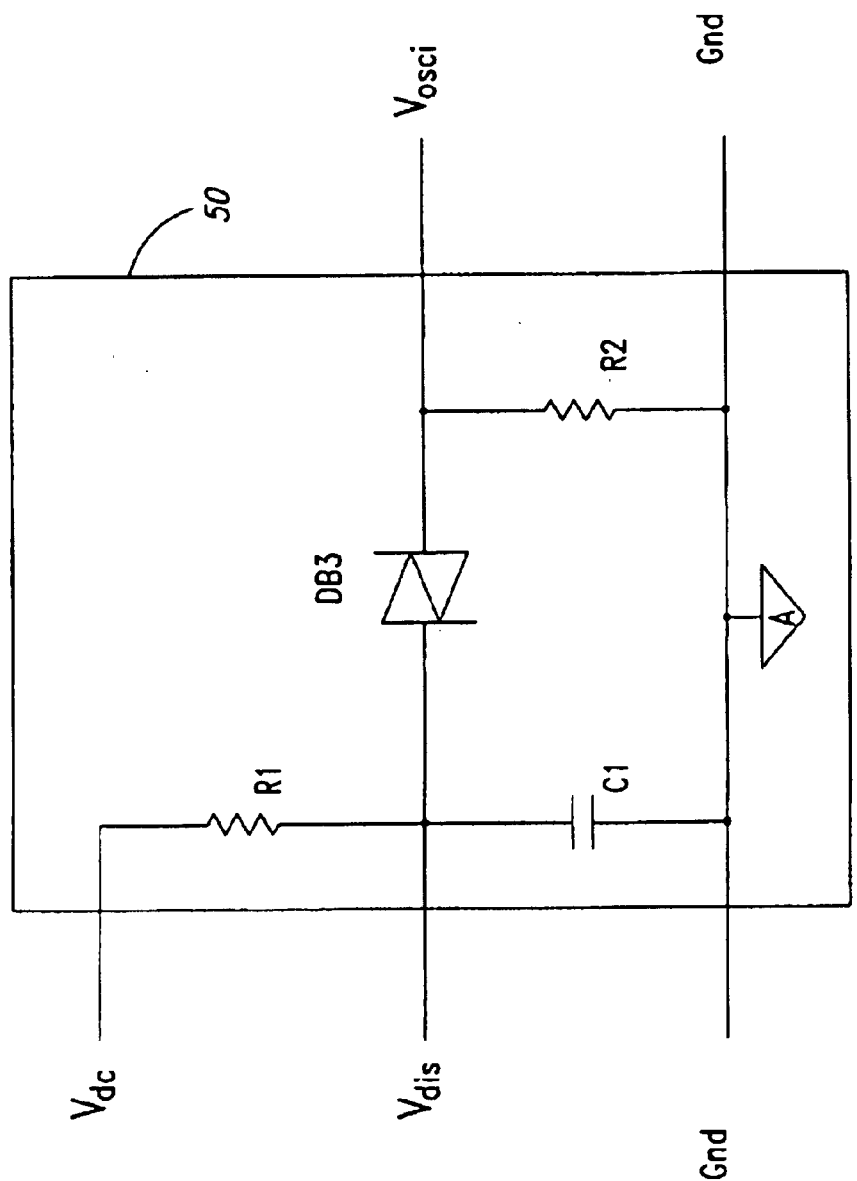
FIG. 2 is an electrical schematic diagram of one illustrated embodiment of a startup circuit for use in the starting circuit.

FIG. 2 shows one illustrated example of the startup circuit 50, including a diac DB3, an input resistor R1, charging-discharging capacitance or capacitor C1, and output resistor R2. As used herein and in the claims, the term capacitor refers to a discrete capacitor and/or an inherent or parasitic capacitance.

The diac DB3 is in a blocking state when the voltage across the terminals of the diac DB3 is below a defined level. For example, the diac DB3 may have a trigger voltage of approximately 32V. Thus, the diac DB3 is in a blocking state until the terminal voltage of the diac DB3 reaches 32 volts, at which point the diac DB3 enters a conducting state, like an ordinary diode.

When the input DC voltage is applied at the high voltage input 12, the charging-discharging capacitor C1 starts charging up from VDC through the input resistor R1. The voltage across the diac DB3 is the same as the voltage across the charging-discharging capacitor C1. Thus, the diac DB3 is in a blocking state. Once the voltage across the capacitor C1 reaches 32 V, the diac DB3 starts conducting with very small forward voltage drop. The energy stored in the charging-discharging capacitor C1 is discharged through the output resistor R2. The voltage across the output resistor R2 serves as the gate drive pulse. The required length of this pulse is determined by the duty ratio of the switch 28a, 28b, for example, power MOSFET or IGBT transistors. The length of the pulse is controlled by the energy stored in the charging-discharging capacitor C1. After the energy in the charging-discharging capacitor C1 is discharged through the output resistor R2, a new cycle starts with the charging-discharging capacitor C1 charging again. The frequency of this charging-discharging cycle is determined by the time constant of the RC circuit formed by the input resistor R1 and charging-discharging capacitor C1, and by the input voltage of VDC. A suitable range may, for example, be from 1 kHz to 5 kHz for the illustrated embodiment.

Each charging-discharging cycle pumps a small amount of energy from the high voltage side 22 to the low voltage side 25 of the high frequency power transformer 16, and the energy is stored in the capacitor 46 across the controller power supply 36.

Figure 3:
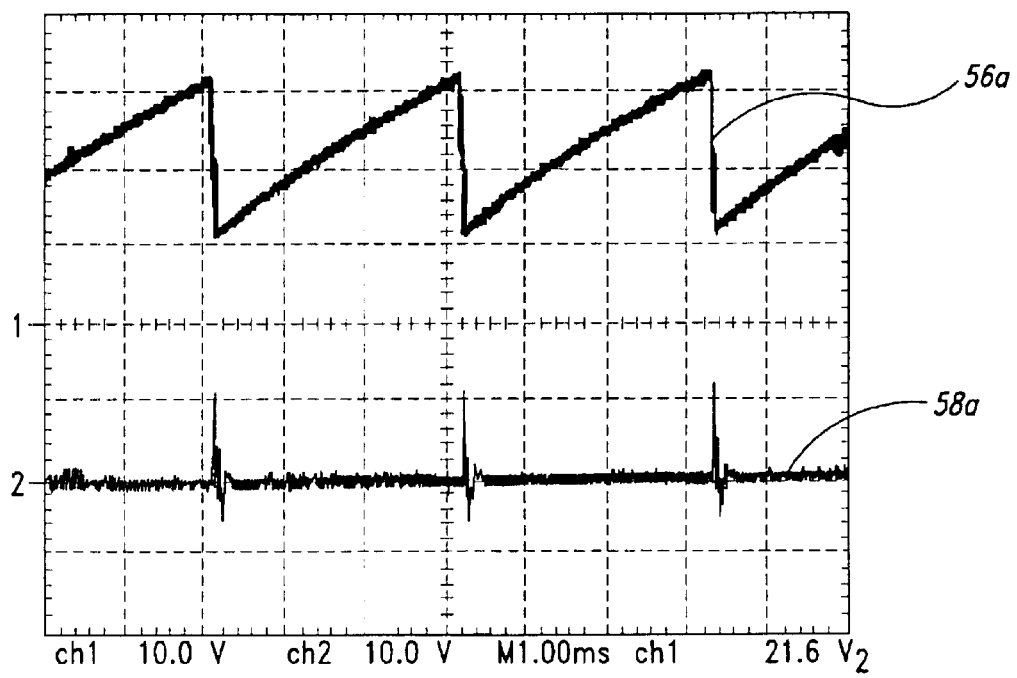
FIG. 3 is a graph illustrating diac oscillation voltage and the resulting startup switching pulses during startup of the converter.

FIG. 3 shows a waveform 56a of the diac oscillation voltage during the startup mode, and a waveform 58a of the resulting startup switching pulses.

The charging-discharging cycle is repeated until the voltage of the controller power supply 36 reaches a minimum level that the controller 30 needs for normal operation. When the controller 30 has the required power, the controller 30 begins generating normal switching pulses. These normal switching pulses are modulated with the existing startup switching pulses. Modulated pulses control the switching of the switches 28a, 28b.

Figure 4:
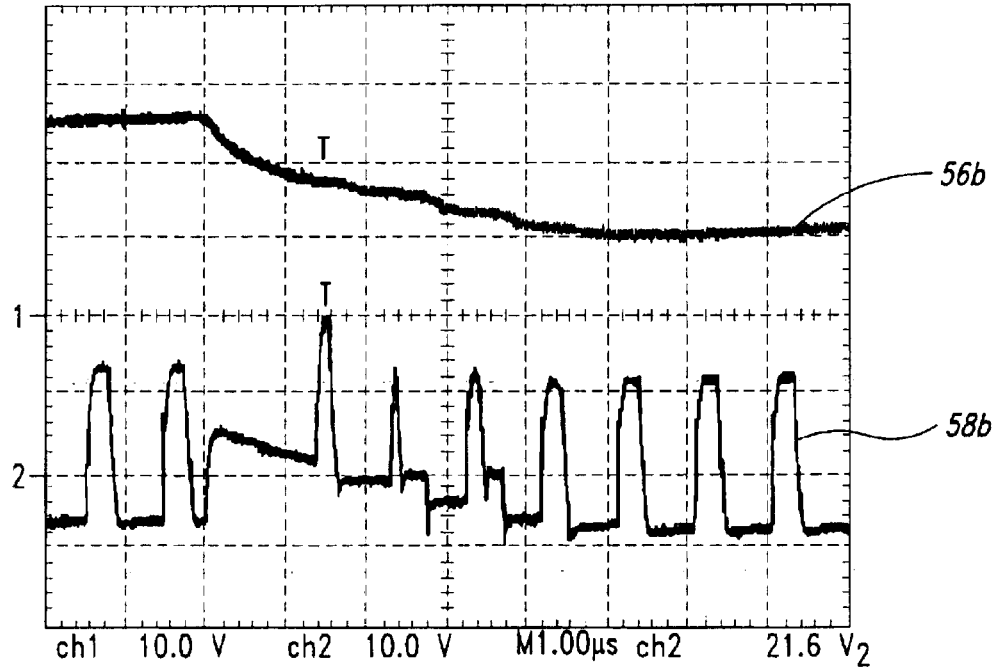
FIG. 4 is a graph illustrating diac oscillation voltage and switching pulse waveforms resulting from modulation between the startup switching pulses and normal switching pulses, where the startup switching pulses have not been disabled.

FIG. 4 shows a waveform 56b of the diac oscillation voltage, and a waveform 58b of the switching pulses resulting from the modulation between the startup switching pulses and the normal switching pulses. As a consequence of the modulation, the controller 30 loses control of the duty ratio of the switching pulse. Additionally, the amplitude of certain modulated pulses is not high enough to ensure that the switches 28a, 28b are fully saturated. As a result, the switches 28a, 28b may be operating in a linear mode, which may result in overheating of the switches 28a, 28b. As discussed above, one approach to preventing the overheating of the switches 28a, 28b is to disable the startup circuit 50 after the controller 30 begins generating normal switching pulses.

Figure 5:
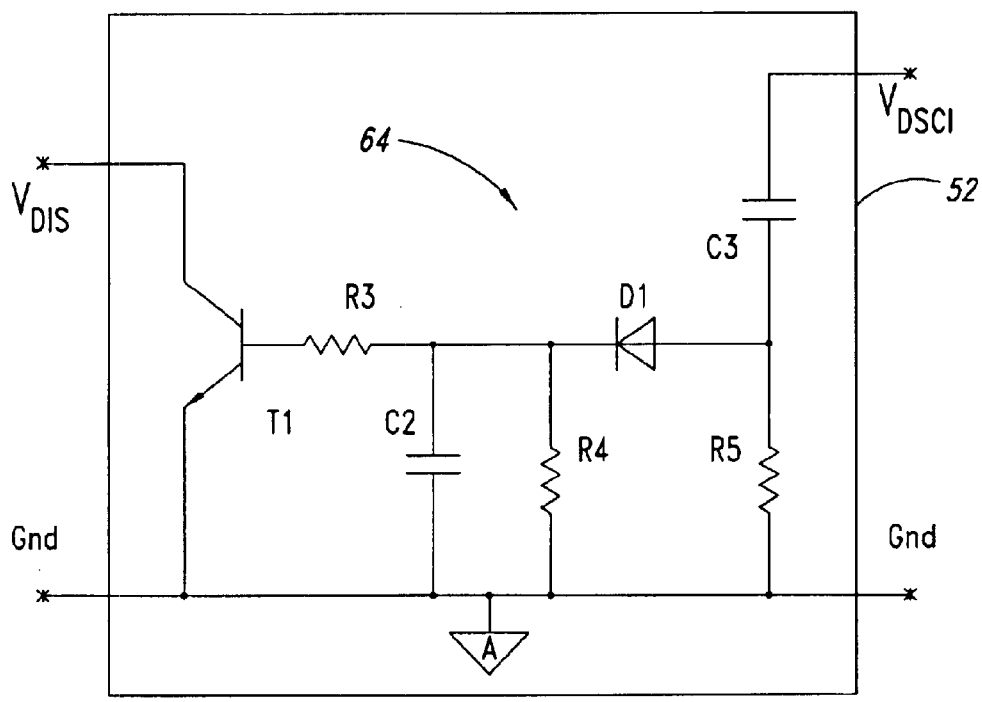
FIG. 5 is an electrical schematic illustrating a disable circuit for use in the starting circuit.

FIG. 5 shows one illustrated example of the disable circuit 52, including a high pass filter 64, an energy storage device such as a storage capacitor C2, electronic switch (e.g., transistor) T1 and associated gate resistor R3. The high pass filter 64 may, for example, have a corner frequency of 50 kHz, passing pulses with a frequency above 50 kHz and blocking pulses with frequency below 50 kHz. Thus, the high pass filter 64 will pass the normal switching pulses having a frequency of 100 kHz, but will block the startup switching pulses having frequencies between 1 kHz and 5 kHz.

The normal switching pulses pass through the filter 64 and charge up the storage capacitor C2. After a few pulses, the voltage across the storage capacitor C2 will be high enough to drive the transistor T1 to saturation. The saturation voltage $V_{dis}$ of the transistor T1, is usually below 1 V. With passing reference to FIG. 2, the saturation voltage $V_{dis}$ is connected to the charging-discharging capacitor C1 of the startup circuit 50, which serves as the source of the startup switching pulses. If the saturation voltage $V_{dis}$ is below 1 volt, as in the case when the normal switching pulses are present, the voltage across the charging-discharging capacitor C1 is locked at the saturation voltage $V_{dis}$, and the startup switching pulses will not be generated.

Figure 6:
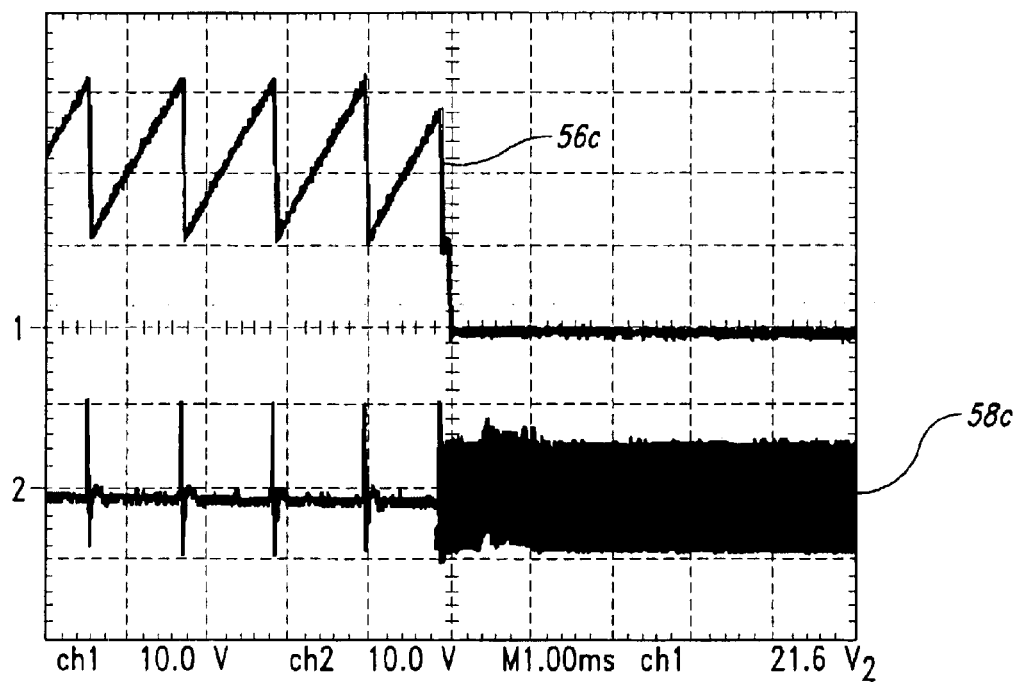
FIG. 6 is a graph illustrating diac oscillation voltage and switching pulses waveforms during a transition from startup to normal switching, where the startup switching pulses are being disabled.

FIG. 6 shows a waveform 56c of the diac oscillation and a waveform 58c of the switching pulses during the transition between startup switching pulse operation and normal switching pulse operation employing the disable circuit 52. As illustrated, there is only one modulated pulse immediately after the transition. This may be the result of residual flux in the high frequency power transformer 16.

Figure 7:
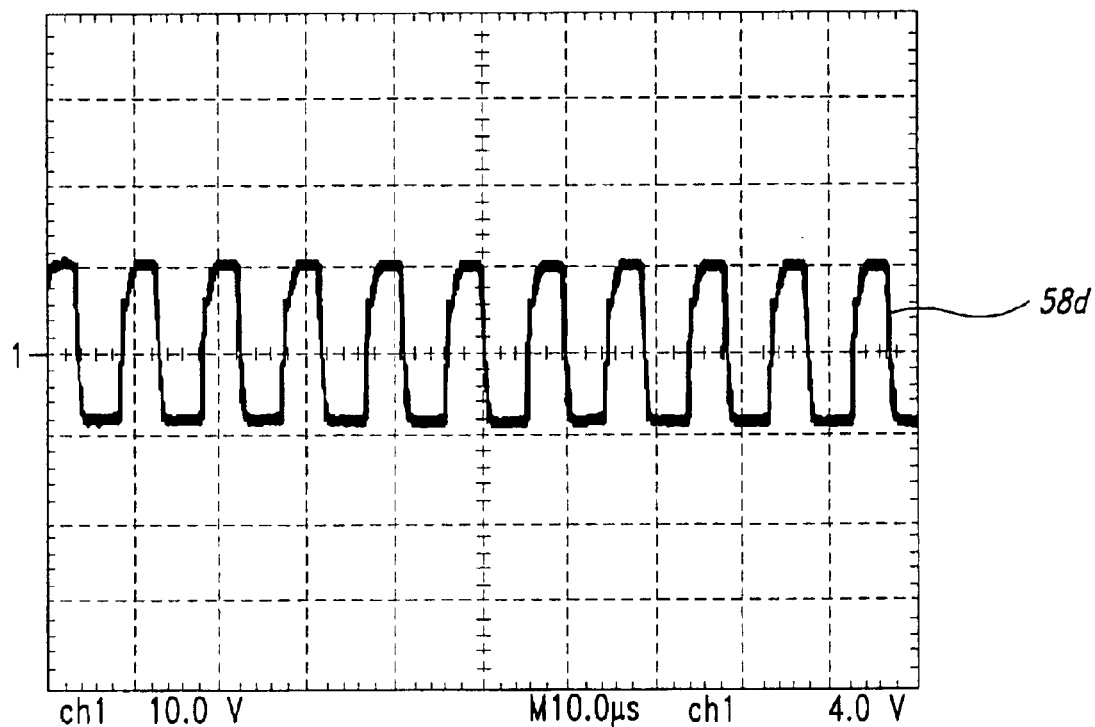
FIG. 7 is a graph illustrating normal switching pulse waveform after startup is complete.

FIG. 7 shows a waveform 58d of the switching pulses after the last modulation, indicated above with reference to FIG. 6. Only normal switching pulses exist in the waveform 58d.

Figure 8:
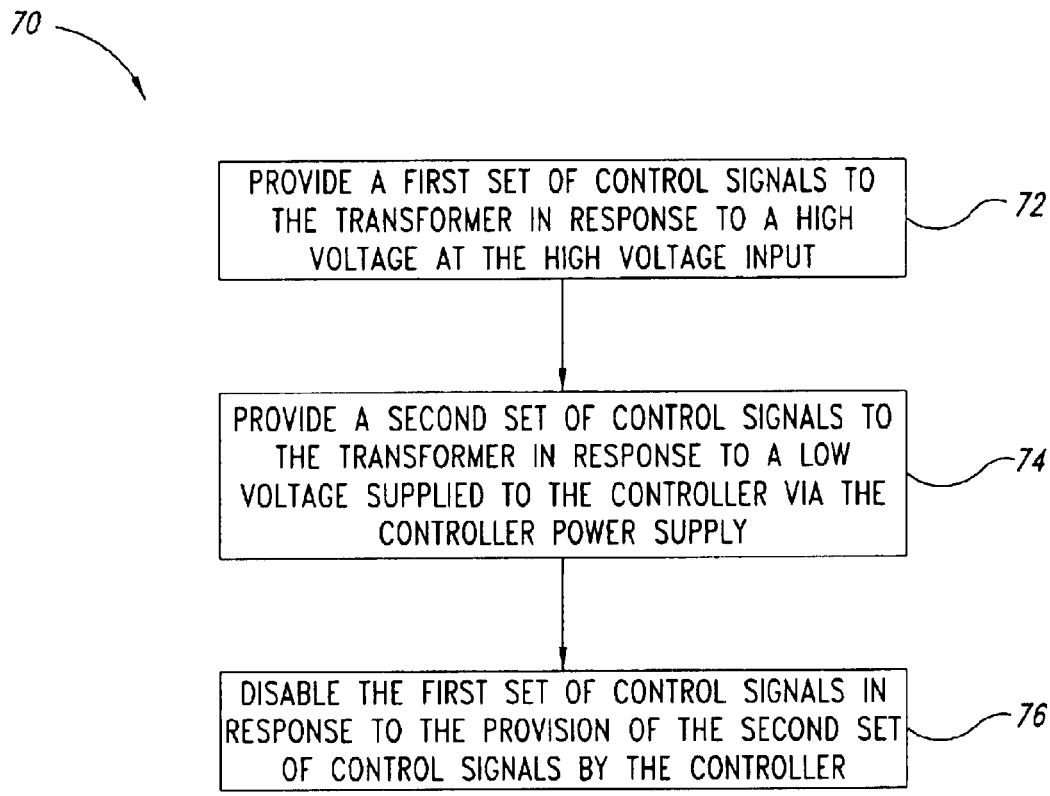
FIG. 8 shows a flow diagram of one illustrated exemplary method of operating the converter.

FIG. 8 shows a flow diagram of one illustrated exemplary method 70 of operating the converter 10. In act 72, the startup circuit provides a first set of control signals to the high frequency power transformer 16 in response to a high voltage supplied to the startup circuit from the high voltage input 12. The startup circuit 50 may provide the first set of control signals as starting switching pulses at a first frequency. In act 74, the controller 30 provides a second set of control signals to the high frequency power transformer 16 in response to a low voltage supplied to the controller 30 via the controller power supply 36. The controller 30 may provide the second set of control signals as normal switching pulses at a second frequency, higher than the first frequency. In act 76, the disable circuit 52 disables the first set of control signals in response to the provision of the second set of control signals by the controller 30. The method 70 may be implemented at each application of power to the high voltage input 12.

Although specific embodiments of, and examples for, the converter are described herein for illustrative purposes, various equivalent modifications can be made without departing from the spirit and scope of the invention, as will be recognized by those skilled in the relevant art. For example, the transformer may take a form other than a high frequency power transformer having a pair of switches. In some embodiments, the functionality can be moved from one subsystem to another. The teachings provided herein can be readily applied to other converters, not necessarily the exemplary two switch forward converter generally described above. The various embodiments as described above can be combined to provide further embodiments. Aspects of the invention can be modified, if necessary, to employ other various systems, circuits and concepts as understood by those skilled in the art.

In general, in the following claims, the terms used should not be construed to limit the invention to specific embodiments disclosed in the specification and claims, but should be construed to include all power converters that operate in accordance with the claims. Accordingly, the invention is not limited to the disclosure, but instead its scope is to be determined entirely by the following claims.

I claim:

1. An electrical power converter, comprising:
a high voltage node;
a low voltage node;
a high frequency power transformer having a high voltage side and a low voltage side, the high frequency power transformer coupled between the high voltage node and the low voltage node;
a controller operatively coupled to provide control signals to the high frequency power transformer;
a controller power supply electrically coupled between the controller and the low voltage side of the high frequency power transformer to provide power to the controller from the low voltage side of the high frequency power transformer; and
a startup circuit electrically coupled between the high voltage node and the high voltage side of the high frequency power transformer to provide control signals to the high frequency power transformer in response to power being applied at the high voltage node, wherein the startup circuit comprises a discrete circuit.

2. The electrical power converter of claim 1, further comprising:
a disable circuit electrically coupled to disable the control signals from the startup circuit in response to the control signals from the controller.

3. The electrical power converter of claim 1, further comprising:
a gate drive pulse transformer having a first side and a second side, the first side electrically coupled to the controller, and the second side electrically coupled to the startup circuit and the high frequency power transformer.

4. The electrical power converter of claim 1, further comprising:
a choke electrically coupled between the low voltage side of the high frequency power transformer and the low voltage node.

5. The electrical power converter of claim 1, further comprising:
input capacitor electrically coupled across the high voltage side of the high frequency power transformer.

6. The electrical power converter of claim 1, further comprising:
an output capacitor electrically coupled across the low voltage side of the high frequency power transformer.

7. The electrical power converter of claim 1 wherein the high voltage side of the high frequency power transformer has a first node and a second node, and further comprising:
a rectifier electrically coupled between the high voltage node and the high voltage side of the high frequency power transformer, the rectifier having a first node and a second node;
a first input diode electrically coupled in series between the first node of the rectifier and the first node of the high voltage side of the high frequency power transformer; and
a second input diode electrically coupled in series between the second node of the rectifier and the second node of the high voltage side of the high frequency power transformer.

8. The electrical power converter of claim 1 wherein the low voltage side of the high frequency power transformer has a first pole and a second pole, and further comprising:
a choke electrically coupled between the low voltage side of the high frequency power transformer and the low voltage node;
a first output diode electrically coupled in series between the first pole of the low voltage side of the high frequency power transformer and the choke; and
a second output diode electrically coupled across the first and the second poles of the low voltage side of the high frequency power transformer.

9. The electrical power converter of claim 1, further comprising:
a rectifier electrically coupled between the high voltage node and the high voltage side of the high frequency power transformer.

10. A circuit for an electrical power converter having a high voltage input and a low voltage output, the circuit comprising:
a high voltage bus having at least a first and a second high voltage rail;
a low voltage bus having at least a first and a second low voltage rail;
a transformer having a primary side and a secondary side, the primary side electrically coupled to respective ones of the first and the second high voltage rails of the high voltage bus, the secondary side of the transformer electrically coupled to respective ones of the first and the second low voltage rails of the low voltage bus, the primary side having a number of power transistors;

a startup circuit coupled to provide control signals in a first frequency range to the power transistors of the transformer in response to a voltage across the high voltage rails of the high voltage bus, wherein the startup circuit comprises a discrete circuit;

a controller coupled to provide control signals in a second frequency range to the power transistors of the transformer;

a controller power supply electrically coupled between the controller and the low voltage bus to provide a low voltage power to the controller during normal operation of the transformer; and a disable circuit electrically coupled to disable the control signals at the first frequency range while allowing the control signals at the second frequency range.

11. The circuit of claim 10 wherein the startup circuit comprises a diac.

12. The circuit of claim 10 wherein the startup circuit comprises:

a first resistor coupled between the high voltage rails of the high voltage bus;

a first capacitor coupled in series with the first resistor between the high voltage rails, the first resistor and the first capacitor setting a time constant defining the first frequency range; and a diac coupled between the transformer and a node between the first resistor and the first capacitor.

13. The circuit of claim 10 wherein the second frequency range is above the first frequency range and the disable circuit comprises a high pass filter.

14. A converter having a high voltage node and a low voltage node, the converter comprising:

transformer means for transforming a high voltage to a low voltage;

startup circuit means for providing a first set of control signals at a first frequency to the transformer means in response to a high voltage at the high voltage node, wherein the startup circuit means comprises a discrete circuit; and control means electrically coupled to a low voltage side of the transformer means for providing a second set of control signals at a second frequency, different from the first frequency, to the transformer means in response to a low voltage produced by the transformer means.

15. The converter of claim 14 wherein the startup circuit means comprises a diac.

16. The converter of claim 14, further comprising:

disabling circuit means for disabling the first set of control signals in response to the second set of control signals.

17. A method of operating a converter having a controller, a startup circuit comprising a discrete circuit, and a high frequency power transformer having a high voltage side and a low voltage side, the method comprising:

providing a first set of control signals at a first frequency from the startup circuit to the high frequency power transformer in response to a high voltage supplied to the startup circuit; and providing a second set of control signals at a second frequency, different from the first frequency, from a control circuit to the high frequency power transformer in response to a low voltage supplied to the control circuit from the low voltage side of the high frequency power transformer.

18. The method of claim 17, further comprising:

disabling the first set of control signals in response to the providing of the second set of control signals to the high frequency power transformer.

19. The method of claim 17, further comprising:

filtering the first set of control signals in response to the providing of the second set of control signals to the high frequency power transformer.

20. The method of claim 17, further comprising:

supplying the low voltage to the control circuit from the low voltage side of the high frequency power transformer via a controller power supply.

21. A circuit for an electrical power converter having a high voltage input and a low voltage output, the circuit comprising:

a high voltage bus having at least a first and a second high voltage rail;

a low voltage bus having at least a first and a second low voltage rail;

a transformer having a primary side and a secondary side, the primary side electrically coupled to respective ones of the first and the second high voltage rails of the high voltage bus, the secondary side of the transformer electrically coupled to respective ones of the first and the second low voltage rails of the low voltage bus, the primary side having a number of power transistors;

a startup circuit coupled to provide control signals in a first frequency range to the power transistors of the transformer in response to a voltage across the high voltage rails of the high voltage bus, wherein the startup circuit comprises:

a first resistor coupled between the high voltage rails of the high voltage bus;

a first capacitor coupled in series with the first resistor between the high voltage rails, the first resistor and the first capacitor setting a time constant defining the first frequency range; and a diac coupled between the transformer and a node between the first resistor and the first capacitor;

a controller coupled to provide control signals in a second frequency range to the power transistors of the transformer;

a controller power supply electrically coupled between the controller and the low voltage bus to provide a low voltage power to the controller during normal operation of the transformer; and a disable circuit electrically coupled to disable the control signals at the first frequency range while allowing the control signals at the second frequency range.

22. A circuit for an electrical power converter having a high voltage input and a low voltage output, the circuit comprising:

a high voltage bus having at least a first and a second high voltage rail;

a low voltage bus having at least a first and a second low voltage rail;

a transformer having a primary side and a secondary side, the primary side electrically coupled to respective ones of the first and the second high voltage rails of the high voltage bus, the secondary side of the transformer electrically coupled to respective ones of the first and the second low voltage rails of the low voltage bus, the primary side having a number of power transistors;

a startup circuit coupled to provide control signals in a first frequency range to the power transistors of the transformer in response to a voltage across the high voltage rails of the high voltage bus;

a controller coupled to provide control signals in a second frequency range to the power transistors of the transformer, wherein the second frequency range is above the first frequency range;

a controller power supply electrically coupled between the controller and the low voltage bus to provide a low voltage power to the controller during normal operation of the transformer; and a disable circuit electrically coupled to disable the control signals at the first frequency range while allowing the control signals at the second frequency range, wherein the disable circuit comprises a high pass filter.

23. The electrical power converter of claim 1 wherein the startup circuit comprises a diac.

* * * * *